No. 712,717. Patented Nov. 4, 1902.
O. H. PIEPER.
ELECTRIC MOTOR.
(Application filed Dec. 4, 1901.)
(No Model.)
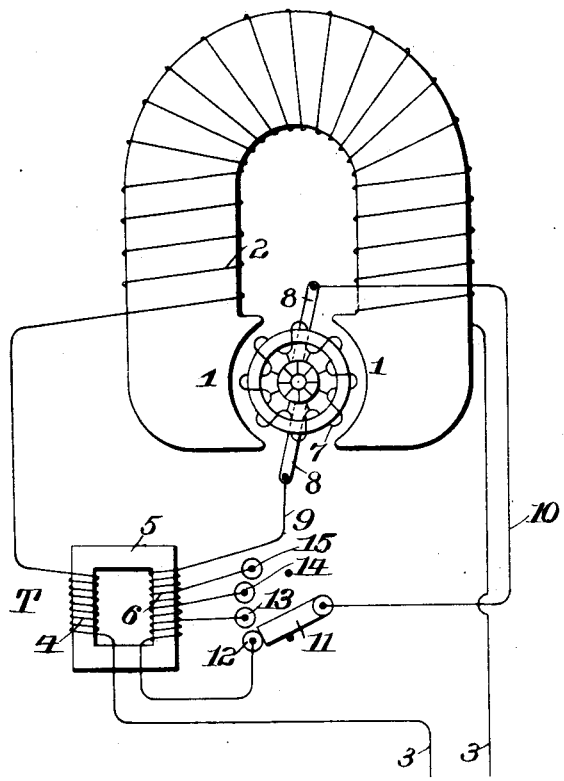
Witnesses. Inventor.

UNITED STATES PATENT OFFICE.

OSCAR H. PIEPER, OF ROCHESTER, NEW YORK.

ELECTRIC MOTOR.

SPECIFICATION forming part of Letters Patent No. 712,717, dated November 4, 1902.

Application filed December 4, 1901. Serial No. 84,614. (No model.)

*To all whom it may concern:*

Be it known that I, OSCAR H. PIEPER, of Rochester, in the county of Monroe and State of New York, have invented certain new and useful Improvements in Electric Motors; and I do hereby declare the following to be a full, clear, and exact description of the same, reference being had to the accompanying drawing, forming a part of this specification, and to the reference characters marked thereon.

My present invention relates to that class of electric motors known as the "direct-current" type, adapted to be operated by alternating electric currents, and has for its object to provide a means for operating motors and an electric motor which may be connected with any suitable source of alternating current and driven at any desired speed suited to the requirements of the service to be performed and capable of regulation.

The invention consists generally in operating motors of the type mentioned by inducing a current in a member of the motor-winding and from the main or supply current and independently of the other member of the motor— a winding so that the currents in both are substantially in phase—that is, the main and derived currents in the field and armature circuits are at maximum and minimum, respectively, at substantially the same time and are not materially varied or affected by magnetic influences, as of the field-magnets, for instance, to interfere with the proper operation.

It further consists in regulating and controlling the operation of motors operated as above by varying the voltage in the armature-circuit.

It further consists in its preferred form in a motor of this type combined with a transformer independent of the field magnets or coils and having its primary in series with the field-coils and its secondary in the armature-circuit and in means for regulating the voltage in the armature-circuit.

Heretofore attempts have been made to operate alternating-current motors of the direct-current type by connecting the armature in circuit with a coil placed upon the field-magnet or in magnetic relation therewith and varying the voltage in this armature-circuit; but it is found that such motors require a very considerable quantity of energy as compared with the quantity required to operate my motor, due, perhaps, to magnetic disturbances caused by the proximity of the coil in circuit with the armature to the field-magnets themselves, the result of the operation of such motors being that there is a very considerable phase difference between the armature and field currents, which interferes with the proper operation of the motor.

In the accompanying drawing the figure illustrates diagrammatically my motor and system of regulation.

In the form of motor shown the pole-pieces of the field-magnets (indicated by 1) may be connected with any suitable form of magnet, 2 indicating the field-coils thereon, connected to the main-line conductors 3, leading to any source of alternating currents. The armature of the motor may be of the usual Gramme ring or Siemens construction, with its coils 7 connected at intervals with the segments of the commutator, the commutator-brushes 8 bearing on the segments corresponding with the neutral coils of the winding or in a two-pole machine at ninety degrees from the axis of the pole-pieces.

In carrying out my invention I employ a transformer T separate from the field-magnets of the motor and out of the magnetic influence of the latter, 4 indicating the primary coil, connected in series with the field-coils of the motor, 5 the core, and 6 the secondary coil, connected in series with the armature. The conductors 9 and 10, leading from the commutator-brushes to the secondary coil 6 of the transformer, are, for the purpose of regulating the motor, connected to a suitable regulating switch or device for varying the voltage in the armature-circuit. In the form shown the conductor 10 is connected with a movable switch-arm 11, adapted to cooperate with the contacts 12, 13, 14, or 15, the first connected to the extreme end of the secondary coil 6 and the contact 13 and the remaining contacts at varying distances intermediate the extreme ends of said secondary coil, the manipulation of the switch serving to cut out more or less of the said coil, and therefore decrease the voltage in the armature-circuit, and thus regulate the speed of the motor.

It is preferable, although not necessary, to wind the field-coils 2 of the motor for a relatively high electromotive force or relatively high self-induction and the armature for a relatively low electromotive force or a relatively low self-induction. This permits me to use a low electromotive force at the armature-terminals, and therefore few turns, preventing the sparking at the commutator and brushes, which is common in alternating-current motors of the direct-current type.

I find that by employing the primary of a transformer in series with the field and its secondary connected to the armature-terminals I am enabled to so proportion the iron and the magnetic and electric circuits that the field and armature currents are practically in phase or step and that the motor may be accurately regulated by varying the voltage at the armature-terminals in the manner described or otherwise.

I claim as my invention—

1. The combination with an electric motor having field-magnets and coils, an armature, commutator and commutator-brushes, of a transformer independent of the field coils or magnets, having its primary connected in series with one of the windings of the motor and its secondary in series with the other.

2. The combination with an alternating-current motor, embodying a field magnet and coils, an armature and commutator and commutator-brushes, of a transformer independent of the field magnets and coils having its primary in series with the field-coils of the motor, and its secondary in series with the armature thereof.

3. The combination with an alternating-current motor embodying a field-magnet, and field-coils, an armature, commutator and commutator-brushes, of a transformer having a core separate from the motor field-magnet, and its primary connected in series with the field-coil, and its secondary coil connected in series with the armature.

4. The combination with an alternating-current motor, embodying a field-magnet and field-coils, an armature, commutator and commutator-brushes, of a transformer separate from the motor having its primary in series with the field-coil of the motor and its secondary connected with the armature.

5. The combination with an alternating-current motor, embodying a field-magnet, field-coil, armature, commutator and commutator-brushes, of a transformer independent of the field-coil having its primary in series with the field-coil and its secondary in circuit with the armature, and means for varying the voltage in the armature-circuit.

OSCAR H. PIEPER.

Witnesses:
F. F. CHURCH,
G. WILLARD RICH.